C. E. SKELTON.
REAMER.
APPLICATION FILED MAR. 28, 1919.

1,405,021.

Patented Jan. 31, 1922.

CHARLES E. SKELTON, INVENTOR.

BY
ATTORNEYS.

UNITED STATES PATENT OFFICE.

CHARLES E. SKELTON, OF EAST ONONDAGA, NEW YORK.

REAMER.

1,405,021. Specification of Letters Patent. Patented Jan. 31, 1922.

Application filed March 28, 1919. Serial No. 285,736.

*To all whom it may concern:*

Be it known that I, CHARLES E. SKELTON, a citizen of the United States, and a resident of East Onondaga, in the county of Onondaga and State of New York, have invented a certain new and useful Reamer, of which the following is a specification.

My invention relates to reamers and has for its object a reamer of the class set forth in my pending applications, executed of even date herewith, Sr. Nos. 285,734 and 285,735, filed March 28, 1919, in which the angle of the bottom of the groove forming the cutting edge is arranged at the same angle to the face of the reamer in which the groove is formed throughout the entire length of the cutting edge.

The invention consists in the novel features hereinafter set forth and claimed.

In describing this invention, reference is had to the accompanying drawings in which like characters designate corresponding parts in all the views.

Figure 1:
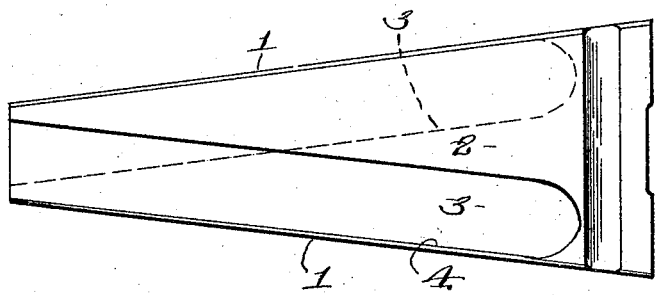
Figures 1 and 2 are respectively, a plan and a side elevation of my reamer.
Figure 2:
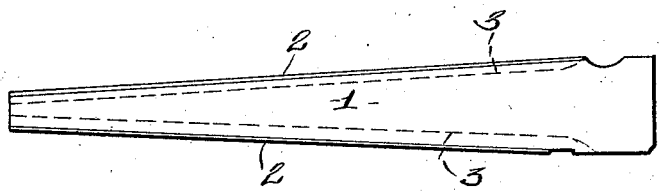
Figure 3:
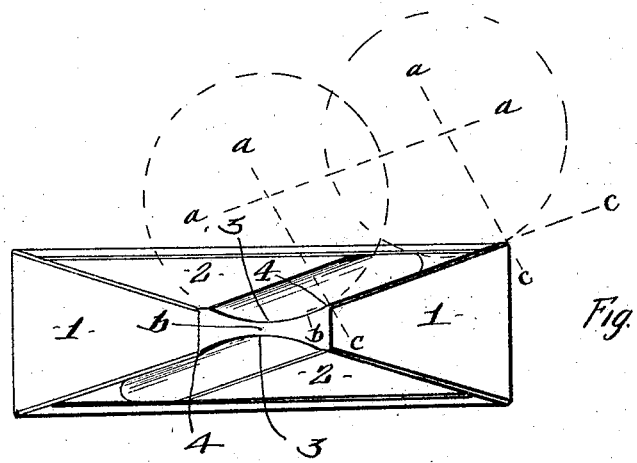
Figure 3 is an end view thereof.

In reamers constructed, as set forth in my pending applications, Sr. Nos. 285,734 and 285,735, filed March 28, 1919, the small end being the same or of greater thickness than the large end, it is impossible for such a reamer to enter a hole unless the hole is somewhat larger in diameter than the thickness of the reamer.

By tapering the reamer so that the thickness of the point or smaller end is considerably less than at the larger end, it is possible to have a reamer with practically the same form in cross section throughout so that the reamer can enter a relatively small hole.

This reamer is formed with faces 1, 2 which taper from the inner end toward the outer so that the reamer is in the form of a cone having an oblong base and the smaller end of the reamer is also oblong in general form and the reamer is also of a similar oblong form at any cross section thereof perpendicular to the axis of the reamer.

The face 2 is formed with a cylindrical groove 3 parallel to the cutting edge 4 and of equal depth throughout the cutting edge so that the arc of the bottom of the groove 3 owing to the tapering of the face 2 intersects the face 2 at the same angle throughout the cutting edge, or the center line $(a)$ of the arc of the groove 3 is so located relatively to the axis $(b)$ of the reamer that a line as $b$—$c$ or a plane radial with the axis of rotation $(b)$ and tangent to or containing the cutting edge, meet at the same angle throughout the cutting edge, lines as $a$—$c$ or a plane radial with the axis $(a)$ of the arc of the groove 3 and meeting the former line $b$—$c$ or plane in the cutting edge.

What I claim is:

1. A reamer having a tapering face, and a tapering side which intersects the tapering face at the cutting edge, the taper of both faces being from one end of the reamer toward the other whereby the reamer is smaller at its outer end both as to width and thickness than at its inner end, said face being formed with a cylindrical groove extending along the cutting edge of equal depth throughout its length and arranged with the center line of its arc substantially parallel with the cutting edge, substantially as and for the purpose described.

2. A reamer having a tapering side and a tapering face which intersects the tapering side at the cutting edge, the taper of both faces being from one end of the reamer toward the other whereby the reamer is smaller at its outer end both as to width and thickness than at the inner end, and is in the form of similar geometrical figures at both ends and at any cross section perpendicular to the axis of the reamer, said face being formed with a groove extending along the cutting edge of equal depth throughout its length, the groove being cylindrical, and the center of the arc of the groove being so arranged relatively to the axis of rotation of the reamer that lines or a plane radial with the axis of rotation of the reamer and tangent to the cutting edge, intersect at the same angle throughout the cutting edge, lines or a plane radial with the center line of the arc of the groove and intersecting the former lines or plane in the cutting edge, substantially as and for the purpose set forth.

In testimony whereof, I have hereunto signed my name, at Syracuse, in the county of Onondaga, and State of New York, this 26th day of February, 1919.

CHARLES E. SKELTON.